Aug. 24, 1943.  J. BOLSEY  2,327,859
COMBINED VIEW-FINDING AND FOCUSING DEVICE
Filed March 28, 1941
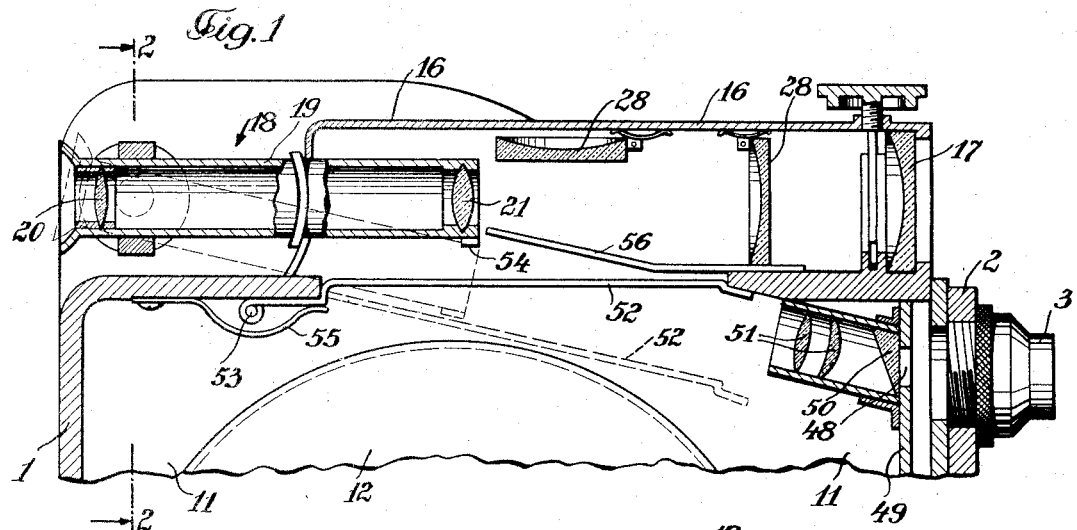
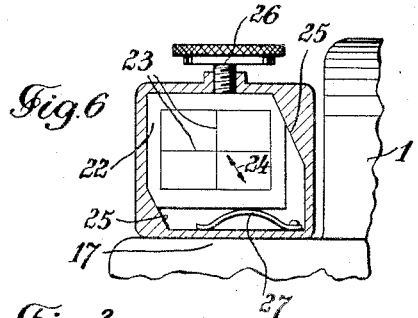
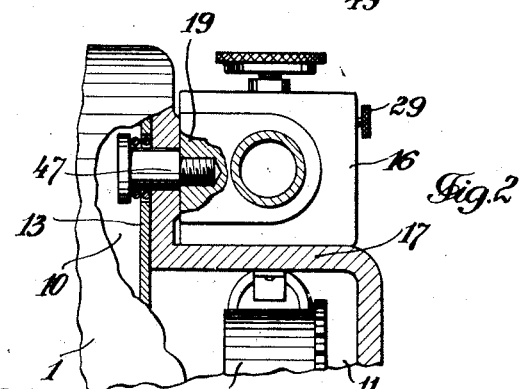
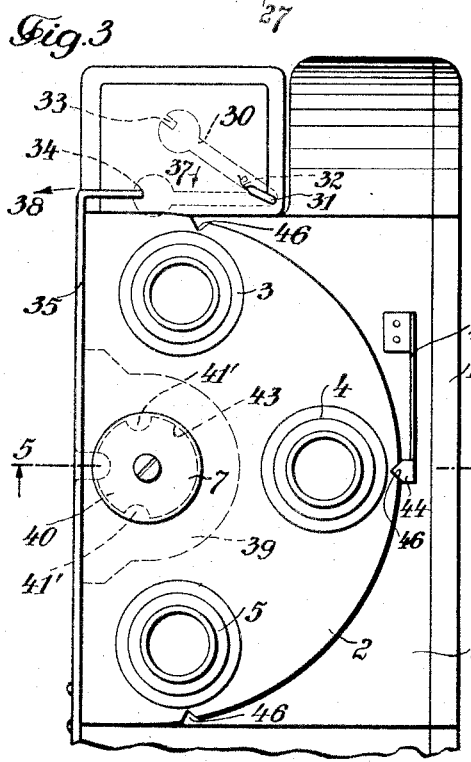
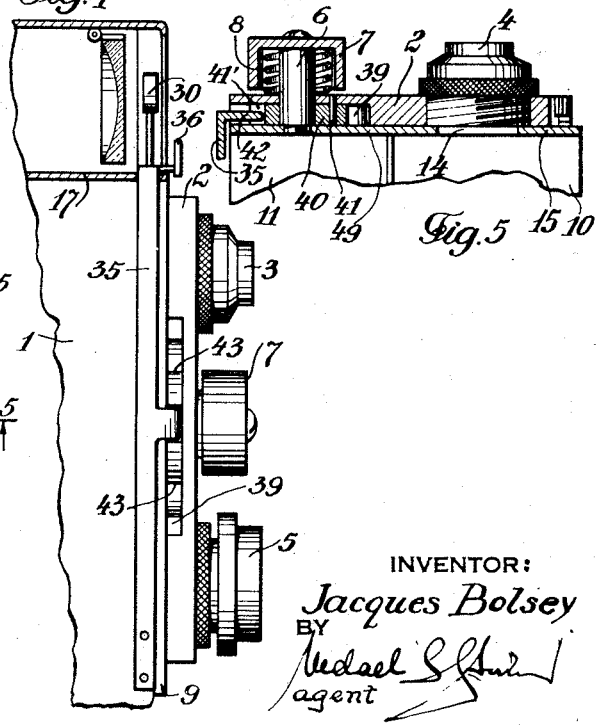
INVENTOR:
Jacques Bolsey
BY
agent Patented Aug. 24, 1943

2,327,859

UNITED STATES PATENT OFFICE 2,327,859

COMBINED VIEW-FINDING AND FOCUSING DEVICE

Jacques Bolsey, New York, N. Y.

Application March 28, 1941, Serial No. 385,633

13 Claims. (Cl. 95—44)

My invention relates to motion picture cameras provided with a sliding support carrying at least two camera lenses adapted to be moved alternately into and out of picture-taking position.

It is an object of my present invention to provide a combined view finding and focusing device for cameras of this type.

It is a further object of my invention to build this view finding and focusing device in such a manner that only one viewing ocular is necessary for both view finding and focusing purposes.

It is still a further object of my invention to arrange the elements and parts of the new device in such a manner that the operator of the camera may be able to use the same viewing ocular for view finding and focusing purposes in an easy and simple way, without cumbersome changes and preparations.

Another object of my invention consists in correcting the parallax of the view finder due to the separation of the view finder objective from the camera lens.

Still another object of my invention consists in means adapted to produce a sign, visible through the viewing ocular, when none of the camera lenses is in picture-taking position.

With the above objects in view, my present invention consists of a new combined view finding and focusing device comprising a stationary view finder objective and a viewing ocular adapted to be shifted to and fro between view finding position, cooperating with said view finder objective, and focusing position cooperating with a camera lens which is moved out of picture-taking position.

The novel features which I consider as characteristic for my invention are set forth in particular in the appended claims. The invention itself, however, both as to its construction and its method of operation, together with additional objects and advantages thereof will be best understood from the following description of specific embodiments, when read in connection with the accompanying drawings, in which:

Fig. 1 is a cross-section of my new device along line 1—1 of Fig. 2;

Fig. 2 is a cross-section of a detail of the device shown in Fig. 1 along line 2—2 of Fig. 1;

Fig. 3 is a front view of a camera with my new view finder, showing also the visible warning sign, described below in detail;

Fig. 4 is a side view of the warning sign of the device shown in Fig. 3, partly in section;

Fig. 5 is a cross-section of the device shown in Figs. 3 and 4, along line 5—5 of Fig. 3; and Fig. 6 is a cross-section of a detail of the view finder with the parallax-correcting means, along line 6—6 of Fig. 1.

As shown in the drawing, the camera comprises a camera casing 1 provided with a turret head, i. e. disk 2, carrying the camera lenses 3, 4 and 5. The disk 2 is turnably secured by means of the projecting part 6, cap 7, and spring 8 to the front wall 9 of camera casing 1.

As usual, the camera consists of a film exposing chamber 10, in which the film transporting mechanism is arranged, and of a spring motor chamber 11 containing spring motor 12. These chambers 10 and 11 are divided from each other by partition wall 13.

As the above described camera elements and parts are well-known to everybody skilled in this art, neither their details nor the mode of operation of such cameras will be described in detail. It should only be noted that disk 2 serves the purpose to bring alternately one of the lenses 3, 4 and 5, which usually have different focal length, into register with picture-taking opening 14 in the front wall 15 of the film exposing chamber 10. Thus, for instance, in the position shown in Fig. 3, camera lens 4 is in register with the picture-taking opening 14 behind it, while camera lenses 3 and 5 are out of register with this opening; by turning of disk 2, lens 4 is turned out of register with opening 14, while one of the lenses 3 and 5—depending on the direction of rotation of disk 2—comes into register with opening 14.

I combine with this camera a view finding device comprising a stationary view finder casing 16 secured to top wall 17 of the spring motor chamber 11. The front end of this casing 16 is formed by a stationary view finder objective 17 cooperating in known manner with the view finder ocular 18 consisting, for instance—as shown in Fig. 1—of the ocular tube 19 and the ocular lenses 20 and 21 therein.

The view finding device is, furthermore, equipped with a slidable glass plate 22 having cross-lines 23, in order to correct the usual parallax due to the separation of the view finder from the camera lens. This glass plate is arranged slidably in the path of the light rays passing through objective 17; furthermore, means are provided in order to slide said glass plate 22 to and fro in direction of arrow 24, normal to the optical axis of objective 17 and the optical axis of the camera lens, which is in register with opening 14, i. e., of the camera lens which is in picture-taking position. These means consist of diagonal surfaces 25 guiding glass plate 22 in direction of arrow 24. Screw 26 and spring 27 serve for adjusting the position of glass plate 22; by turning screw 26 it is possible to slide plate 22, in direction of arrow 24, into the required position.

Furthermore, additional tiltable lenses 28 are arranged in the view finder casing 16 for adjusting the view finder to different viewing distances. These additional lenses 28 are tilted by means of operating knobs 29, arranged on the outer surface of casing 16, into and out of the path of the light rays passing through this casing.

I may, furthermore, provide a warning signal which is visible through the view finder when none of the camera lenses 3, 4 and 5 is in picture-taking position, i. e., in register with opening 14. This warning signal consists of a warning sign 30 arranged tiltably about pivot 31, and is pressed by spring 32 into visible position, shown in Fig. 3 in full lines. In nonvisible position, shown in Fig. 3 in dotted lines, cut-out 33 in sign 30 engages the point 34 of leaf spring 35 and is held by this spring in non-visible position. In order to move sign 30 from visible into non-visible position pivot 31 is provided at its free end with an operating lever 36 adapted to be turned by hand, as shown in Fig. 4. By turning this lever, sign 30 can be moved in direction of arrow 37 until its cut-out 33 engages point 34 of spring 35, thereby becoming non-visible in the visual field of the view finder; it is held by spring 35 in this non-visible position until this spring is moved in direction of arrow 38.

Since sign 30 has to be visible when none of the lenses 3, 4 and 5 is in register with opening 14, spring 35 has to be disengaged immediately from sign 30 when one of the lenses 3, 4 or 5 moves out of register with opening 14. For this purpose disk 2 is provided with a circular recess 39 and an annular ring 40 therein; ring 40 is secured to disk 2 by means of pin 41. This annular ring 40 is provided with cut-outs 41', as shown in Fig. 3. These cut-outs 41' are arranged in such a manner that one of them is in register and engages projection 42 of spring 35 when one of the lenses 3, 4 and 5 is in picture-taking position in register with opening 14. When none of the lenses 3, 4 and 5 is in picture-taking position, projection 42 is pushed by the peripheral annular surface 43 of the annular member 40 in the direction of arrow 38 and releases thereby sign 30, which is moved by action of spring 32 into warning position, visible through the view finder.

When the operator looks through the view finder and sees the sign, he will know that he did not check the position of disk 2 and of the camera lenses carried by this disk, and then will push lever 36 downward, removing thereby sign 30 from the visual field of the view finder; if the sign remains non-visible he will know that it engaged point 34 of spring 35, and that one of the lenses 3, 4 and 5 is in picture-taking position. If sign 30 returns into visible position after pushing down, he will know that point 34 did not engage sign 30 and that projection 42 of spring 35 is not in engagement with any of the cut-outs 41'. Then he also will know that none of the lenses 3, 4 and 5 is in register with opening 14 and that he has first to turn disk 2 into correct picture-taking position, i. e. into a position in which one of the lenses 3, 4 and 5 is in register with the picture-taking opening 14, before he starts with the operation of the camera.

Controlling pin 44, carried by spring lever 45 and being secured to front wall 9 of the camera casing, engages one of the cut-outs 46 in the peripheral face of disk 2 when one of the lenses is in picture-taking position. The mode of operation of this controlling device is well known to everybody skilled in this art and will therefore not be described in detail.

As set forth in my statement of invention, it is one of the main objects of my present invention to provide a combined view finding and focusing device, in which only one viewing ocular is necessary for both view finding and focusing purposes, i. e., in which the operator of the camera is able to use the same viewing ocular for both purposes, without cumbersome changes and preparations.

In order to attain this object, I arrange the viewing ocular 18 of the view finder in such a manner that it is adapted to be turned to and fro between view finding position cooperating with the view finder objective 17, and focusing position cooperating with camera lens 3, moved out of picture-taking position. This turning is enabled by securing the viewing ocular 18 by means of screw 47 turnably to partition wall 13 in such a manner that it can be shifted from the position shown in Fig. 1, in full lines, into the position shown in dotted lines, and back.

In the position shown in full lines, the lenses 21 of the ocular 18 are in alignment with lens 17 of the view finding objective and thus, in this position, the view finding ocular is adapted for view finding purposes.

A light transmitting focusing opening 48 is arranged in the front wall 49 of the spring motor chamber 11 in register with the camera lens 3, which is out of register with the picture-taking opening 14. Inside of the spring motor chamber 11 a light deflecting member 50 and an additional lens system 51 is arranged behind opening 48 in such a manner that the light rays passing through lens 3 are reflected and directed into ocular 18 when the same is in the position indicated in Fig. 1, in dotted lines. In this position the ocular 18 is adapted to be used—in combinatiton with the camera lens 3, light deflecting member 50, and lens system 51—for focusing purposes.

It is important to exclude entry of light into ocular 18 through lens 3 and focusing opening 48 when this ocular 18 is in view finding position, shown in Fig. 1, in full lines; and, vice versa, entry of light into ocular 18 through the view finder objective 17 must be excluded when the ocular is in focusing position, shown in Fig. 1 in dotted lines.

In order to attain the first of above objects, I provide a tiltable light excluding partition plate 52, hingeably secured by means of hinge 53 to top wall 7 of the spring motor chamber 10; this partition plate is arranged in such a manner that it is adapted to be tilted to and fro between view finding position, in which it excludes entry of light through camera lens 3 and focusing opening 48 into the view finder casing 16—shown in Fig. 1 in full lines—and between focusing position, in which it enables free passage for the light rays between the focusing opening 48 and the ocular 18, tilted in focusing position; the latter position of plate 52 is shown in Fig. 1 in dotted lines. Plate 52 is tilted in focusing position by tilting ocular 18, which, by means of projection 54, pushes plate 52 into focusing position, indicated in dotted lines (Fig. 1). When ocular 18 is tilted back into view finding position, plate 52 is tilted by action of spring 55 into view finding position, too, closing the opening between chamber 10 and casing 16, as shown in Fig. 1, in full lines.

In order to attain the second of the above objects, i. e., to exclude entry of light into ocular 18 through objective 17 when the ocular is in focusing position, a stationary light excluding partition plate 56 is arranged between casing 16 and chamber 10 in such a manner that it excludes entry of light through objective 17 into ocular 18 when the ocular is in the position shown in Fig. 1, in dotted lines, and enables entry of light through the objective 17 when the ocular is in the position shown in full lines.

The mode of operation of my new combined view finding and focusing device is the following:

First, the camera lens which is to be used for the next picture taking is turned by means of disk 2 into the position of lens 3, i. e., into the position in which this lens is in register with the focusing opening 48. Then, the operator focuses the camera, while looking through the ocular 18, which is during this focusing operation in the position shown in Fig. 1, in dotted lines.

Thereafter, the operator turns the camera lens from focusing position into picture-taking position, in which the lens is in register with the picture-taking opening 14 and turns ocular 18 into the position shown in Fig. 1, in full lines, in which the ocular is in alignment with the objective 17, i. e., in which it is adapted for view finding purposes.

After checking the correct position of the camera lens by means of the warning sign 30 described above in detail, and after adjusting glass plate 22, provided with cross lines 23, and tilting one or more of the additional lenses 28 into the required position, the camera is ready for picture taking. During picture taking the operator uses the view finder in the usual manner.

It will be understood that each of the elements described above, or two or more together, may also find a useful application in other types of motion picture cameras, differing from the types described above.

While I have illustrated and described the invention as embodied in motion picture cameras, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention.

Thus, for instance, I want to stress that I do not intend to be limited to cameras with sliding or rotating supports, e. g., turrets carrying at least two camera lenses adapted to be moved alternately into and out of picture-taking position: My invention is also well adapted for cameras provided with two interchangeable camera lenses, even if these lenses are not mounted on shiftable or rotatable supports. In this case, the viewing ocular must be adapted to cooperate with one of these stationary lenses, while the picture is taken by the other lens. It is also possible to provide only one single interchangeable camera lens and to arrange the viewing ocular in such a manner that it be adapted to be shifted to and fro between view-finding position and focusing position cooperating with this single camera lens.

Furthermore, I wish to stress that I do not want to be limited to view finders which comprise a stationary view finder objective; it is possible also to build the viewing ocular in such a manner that it be adapted for view-finding purposes without additional objective, i. e., that the view-finding ocular comprise all optical parts necessary for view-finding purposes.

Therefore, all modifications and structural changes which may be made without departing in any way from the spirit of my invention, especially the above described modifications and adaptations of my invention, should and are intended to be comprehended within the meaning and range of equivalency of the following claims.

What I claim as new and desire to secure by Letters Patent is:

1. Combined view finding and focusing device for motion picture cameras provided with a movable support carrying at least two camera lenses adapted to be moved alternately into and out of picture taking position, said device comprising a stationary view finder objective, and a viewing ocular adapted to be turned to and fro between view-finding position cooperating with said view finder objective, and focusing position cooperating with one of the camera leases which is moved out of picture taking position.

2. Combined view finding and focusing device for motion picture cameras provided with a rotating turrent disk carrying at equal distance from its center of rotation at least two camera lenses adapted to be moved alternately into and out of picture-taking position, said device comprising a stationary view finder objective, a viewing ocular adapted to be shifted to and fro between view finding position co-operating with said view finder objective and focusing position cooperating with a camera lens which is turned out of picture-taking position.

3. Combined view finding and focusing device for motion picture cameras provided with a rotating turret disk carrying at equal distance from its center of rotation at least two camera lenses, means adapted to turn said turret head with said lenses between two positions in one of which one of said lenses is in register with a light-transmitting picture-taking opening in the front wall of said camera and the other of said lenses is out of register with said light-transmitting picture-taking opening and in the other of which positions the relation of said lenses to said picture-taking opening is reversed, said device comprising a stationary light-deflecting optical system adapted to be in register with a camera lens which is in a position out of register with said light-transmitting picture taking opening, and a viewing ocular adapted to be shifted to and fro between view finding position and focusing position cooperating with said light-deflecting optical system.

4. Combined view finding and focusing device for motion picture cameras provided with a sliding support carrying at least two camera lenses adapted to be moved alternately into and out of register with a light-transmitting, picture-taking opening in the front wall of said camera, said device comprising a light-transmitting focusing opening in the front wall of said camera adapted to be in register with a camera lens which is moved out of register with said picture-taking opening in the front wall of said camera, a stationary light-deflecting optical system arranged inside of the camera casing behind said focusing opening and a viewing ocular adapted to be shifted to and fro between view finding position and focusing position cooperating with said light-deflecting optical system.

5. Combined view finding and focusing device for motion picture cameras provided with a rotating turret disk carrying at equal distance from its center of rotation at least two camera lenses adapted to be turned alternately into and out of register with a light-transmitting picture-taking opening in the front wall of said camera, said device comprising a light-transmitting focusing opening in the front wall of said camera adapted to be in register with a camera lens which is moved out of register with said picture-taking opening in the front wall of said camera, a stationary light deflecting optical system arranged, with its frontal face in the plane of the film portion to be exposed, inside of the camera casing behind said focusing opening, and a viewing ocular adapted to be shifted to and fro between view finding position and focusing position cooperating with said light deflecting optical system.

6. Combined view finding and focusing device for motion picture cameras provided with a film exposing chamber, a spring motor chamber, and a rotating turret disk carrying at equal distance from its center of rotation at least two camera lenses, adapted to be rotated alternately into and out of register with a light transmitting picture-taking opening in the front wall of said film exposing chamber, said device comprising a stationary view finder objective, a light transmitting focusing opening in the front wall of said spring motor chamber adapted to be in register with a camera lens which is moved out of register with said picture-taking opening, a stationary light deflecting optical system arranged in said spring motor chamber behind said focusing opening, and a viewing ocular adapted to be shifted to and fro between view finding position cooperating with said view finder objective, and focusing position cooperating with said light deflecting optical system.

7. Combined view finding and focusing device for motion picture cameras provided with a film exposing chamber, a spring motor chamber, and a rotating turret disk carrying at equal distance from its center of rotation at least two camera lenses, adapted to be rotated alternately into and out of register with a light transmitting picture-taking opening in the front wall of said film exposing chamber, said device comprising a stationary view finder objective arranged on the top of said spring motor chamber, a light transmitting focusing opening in the front wall of said spring motor chamber adapted to be in register with a camera lens which is moved out of register with said picture-taking opening, a stationary light deflecting optical system arranged in said spring motor chamber behind said focusing opening, and a tiltable viewing ocular arranged on top of the spring motor chamber in such a manner as to be adapted to be tilted to and fro between view finding position cooperating with said view finder objective, and focusing position cooperating with said light deflecting optical system.

8. Combined view finding and focusing device for motion picture cameras provided with a sliding support carrying at least two camera lenses adapted to be moved alternately into and out of picture-taking position, said device comprising a view finder casing, a stationary view finder objective in the front wall of said casing, a tiltable viewing ocular arranged in the rear part of said casing in such a manner as to be adapted to be tilted to and fro between view finding position cooperating with said view finder objective, and focusing position cooperating with a camera lens which is moved out of picture-taking position.

9. Combined view finding and focusing device for motion picture cameras provided with a film exposing chamber, a spring motor chamber, and a rotating turret disk carrying at equal distance from its center of rotation at least two camera lenses, adapted to be rotated alternately into and out of register with a light transmitting picture-taking opening in the front wall of said film exposing chamber, said device comprising a stationary view finder casing arranged on the top of said spring motor chamber, a stationary view finder objective in the front part of said view finder casing, a light transmitting focusing opening in the front wall of said spring motor chamber adapted to be in register with a camera lens which is moved out of register with said picture-taking opening, a stationary light deflecting optical system arranged in said spring motor chamber behind said focusing opening, and a tiltable viewing ocular arranged in the rear part of said view finder casing in such a manner as to be adapted to be tilted to and fro between view finding position cooperating with said view finder objective, and focusing position cooperating with said light deflecting optical system.

10. In a combined view finding and focusing device for motion picture cameras, according to claim 9, a tiltable light excluding partition plate between said spring motor chamber and said view finder casing, said plate adapted to be tilted to and fro between view finding position in which it excludes entry of light into said view finder casing through said camera lens shifted out of register with said picture taking opening and said focusing opening in the front wall of the spring motor chamber, and focusing position in which it enables free passage of light rays between said focusing opening and the viewing ocular tilted in focusing position.

11. In a combined view finding and focusing device for motion picture cameras, according to claim 9, a light excluding partition plate arranged between said view finder casing and said spring motor chamber, in such a manner that it excludes the entry of light through said view finder objective into said tiltable viewing ocular when said ocular is in focusing position and enables entry of light through said view finder objective when said ocular is in view finding position.

12. In a combined view finding and focusing device for motion picture cameras, according to claim 9, a stationary light excluding partition plate arranged in said view finder casing in such a manner that it excludes the entry of light through said view finder objective into said tiltable viewing ocular when said ocular is in focusing position and enables entry of light through said view finder objective when said ocular is in view finding position, and a tiltable light excluding partition plate between said spring motor chamber and said view finder casing, said plate adapted to be tilted to and fro between a view finding position in which it excludes entry of light into said view finder casing through said camera lens shifted out of register with said picture-taking opening and said focusing opening in the front wall of the spring motor chamber, and a focusing position in which it enables free passage of light rays between said focusing opening and the viewing ocular tilted in focusing position.

13. Combined view finding and focusing device for motion picture cameras provided with a sliding support carrying at least two camera lenses adapted to be moved alternately into and out of picture-taking position, said device comprising a stationary view finder objective, a viewing ocular, means tiltably securing said viewing ocular to the casing of said camera, said viewing ocular adapted to be tilted to and fro between view finding position cooperating with said view finder objective, and focusing position cooperating with a camera lens which is moved out of picture-taking position.

JACQUES BOLSEY.